3,661,962
MOLECULAR WEIGHT CONTROL AND
POLYSILOXANES
Lothar Ernst Geipel, Adrian, Mich., assignor to Stauffer-Wacker Silicone Corporation, Adrian, Mich.
No Drawing. Filed May 9, 1969, Ser. No. 823,486
Int. Cl. C07f 7/08
U.S. Cl. 260—448.2 E                 9 Claims

ABSTRACT OF THE DISCLOSURE

Hexamethyldisiloxane is used to control the molecular weight in the polymerization of cyclic siloxanes with a basic catalyst. The addition of a promoter, such as dimethylformamide, permits efficient utilization of the hexamethyldisiloxane and thereby permits accurate control over the molecular weight of the polysiloxane.

---

This invention relates to a process for the polymerization of cyclic siloxanes and more particularly to a method for controlling the molecular weight in such polymerizations.

It is well known that cyclic siloxanes may be polymerized with an acid catalyst and that the degree of polymerization may be controlled by incorporating an endblocker, such as hexamethyldisiloxane (MM), or a linear polysiloxane containing trimethylsilyl endgroups. The use of alkaline catalysts in such polymerizations is also well known and in many cases it is preferred to use alkaline catalysts, particularly when acid-sensitive groups are present. Under alkaline conditions, however, MM is very much less reactive than the higher linear polysiloxanes. In fact, MM has been of no practical value as an endblocker in alkaline polymerizations. This is unfortunate because MM is readily available in pure form, but the higher linear polysiloxanes are not. It would be most desirable from the standpoint of economy and purity of the final product if an alkaline polymerization process could be found wherein MM could be used efficiently as the endblocker.

Therefore, it is an object of this invention to provide a method for polymerizing cyclosiloxanes in the presence of an alkaline catalyst in which the molecular weight is controlled by hexamethyldisiloxane. Another object of this invention is to provide a rapid, clean-cut method for the polymerization of cyclic siloxanes to polymers of controlled molecular weight. A further object of this invention is to provide a method for preparing siloxane fluids of controlled molecular weight.

The foregoing objects and others which will become apparent in the following description are accomplished in accordance with this invention, generally speaking, by polymerizing a mixture containing cyclic siloxanes and hexamethyldisiloxane in the presence of an alkaline catalyst and a promoter. The cyclic siloxanes mentioned above are embraced by the formula:

$$(R_2SiO)_x$$

in which $x$ may range from 3 to about 8. Most suitable are the cyclic tetramers in which $x$ is 4. The R groups generally represent methyl, although these may be substituted in part by larger alkyl groups having up to 8 carbon atoms, phenyl groups or chlorinated phenyl groups to the extent of as much as 25 percent or sometimes as much as 50 percent of the total number of R groups. Such cyclic siloxanes are properly designated as octaorganocyclotetrasiloxanes. The cyclic siloxanes may be pure compounds, such as octamethylcyclotetrasiloxane ($D_4$) or tetramethyltetraphenylcyclotetrasiloxane, or mixtures of cyclic siloxanes, such as a mixture of $D_4$ and octaphenylcyclotetrasiloxane.

The degree of polymerization (DP) or viscosity is controlled by the ratio of MM to $D_4$. A low DP is obtained with a high proportion of MM whereas very high DP's can be obtained with very low proportions of MM. It has been found possible by the method of this invention to control the degree of polymerization of the polymers to such an extent that the viscosity may range up to as high as 100,000,000 centipoises.

Strong bases generally may be used as catalysts in the practice of this invention. However, the preferred catalysts are the strong quaternary ammonium bases, such as the hydroxides, silanolates or siloxanolates. Tetraalkylammonium siloxanolate catalysts can be made, e.g., by heating a mixture of tetramethylammonium hydroxide and octamethylcyclotetrasiloxane, followed by dehydration. Suitable siloxanolate catalysts and their preparation are described in U.S. 3,433,765. There is a two-fold advantage in the use of such quaternary ammonium catalysts. Firstly, they are stronger bases and therefore more effective catalysts than the corresponding sodium and potassium compounds. Secondly, they are fugitive catalysts; that is, they may be completely destroyed by subsequent heating at a temperature somewhat higher than that required for polymerization. This is a particular advantage when highly viscous polymers are produced because otherwise the extraction or neutralization of the base may be very difficult, and it is important for the stability of the polymer that all traces of the catalyst be removed.

The catalyst is effective in low concentrations, i.e., in amounts corresponding to 5–200 p.p.m., preferably 10–100 p.p.m., based on the tetramethylammonium hydroxide equivalent present in the catalyst.

The promoter, which is an essential part of this invention, is a compound which has the ability by virtue of its polar nature to increase the concentration of free anions in the reaction mixture through cation solvation. Examples of suitable promoters are dimethylsulfoxide, hexamethylphosphoric triamide, and N,N-dialkylcarboxylic amides, such as dimethylformamide and dimethylacetamide. The promoter is normally added in an amount equivalent to from 0.5 to 5 percent of the weight of the siloxane mixture.

The reaction temperature is not critical and temperatures from about 25° to about 125° C. may be employed. Higher temperatures should not be used as the catalyst is subject to rapid decomposition above 125° C. The preferred range of temperature is from about 60° to about 100° C.

In some cases, particularly when a solid siloxane such as octaphenylcyclotetrasiloxane is used, it is desirable to include an inert solvent such as benzene, toluene, xylene and the like.

It is found that the siloxane polymers prepared in accordance with this invention are in every way comparable with those prepared by other methods. In certain applications they may be superior, because it has been found that these polymers are exceptionally low in terminal-OH content. These siloxane polymers may be used as intermediates in the preparation of other complex silicone compounds. They may also be used as plasticizers or softeners for various resins, as electrical insulation fluids, damping fluids and as lubricants.

The invention is further illustrated by the following examples, which are not be taken as in any way limitative of the scope thereof.

EXAMPLE 1

A 2-liter reactor equipped with a stirrer and thermometer is purged with dry nitrogen prior to the addition of 1150 parts of $D_4$ and 14.4 parts of hexamethyldisiloxane (MM). After heating the mixture to 80° C., 0.5 part of tetramethylammonium siloxanolate catalyst, prepared from tetramethylammonium hydroxide and $D_4$ and corresponding to 0.035 part of tetramethylammonium hydroxide, is added. After 6 hours at 80° C., the viscosity of the reaction product is about 7200 centipoises, indicating very incomplete utilization of the MM.

EXAMPLE 2

The procedure of Example 1 is repeated except that 25 parts of dimethylformamide is added to the reaction mass prior to the application of heat. In less than 18 minutes, the viscosity of the reaction mass is 300 centipoises and after heating for an additional 1.66 hours, the viscosity is still about 300 centipoises. This is the viscosity expected from complete equilibration of the $D_4$ and MM.

EXAMPLE 3

In accordance with the procedure described in Example 2, 28 parts of dimethylacetamide is added to the reaction mass prior to the application of heat. In about 20 minutes, the viscosity of the fluid is stabilized at about 300 centipoises.

EXAMPLE 4

Following the general procedure described in Example 2, dimethylsulfoxide is substituted for dimethylformamide and again equilibrium is attained in less than 20 minutes.

EXAMPLE 5

The procedure of Example 2 is repeated except that a mixture consisting of 950 parts of $D_4$ and 160 parts of tetramethyltetraphenylcyclotetrasiloxane is substituted for pure $D_4$, and hexamethylphosphoric triamide is employed as the promoter. Upon heating the mixture to 80° C. and addition of tetramethylammonium siloxanolate, equilibration is achieved within a matter of minutes.

EXAMPLE 6

A 1-liter reactor equipped with a stirrer and thermometer is purged with dry nitrogen prior to the addition of 380 parts of $D_4$, 5.3 parts of MM and 8.5 parts of dimethylformamide. After heating the mixture to 100° C., 0.15 part of tetramethylammonium siloxanolate which corresponds to 0.003 part of tetramethylammonium hydroxide is added. After heating for about 15 minutes, the reaction mass is washed with 400 parts of water and rewashed with 2 additional portions of water, separated, and stripped under vacuum to a temperature of 190° C. A siloxane fluid is recovered having a viscosity of 330 centipoises.

EXAMPLE 7

Siloxane polymers are prepared by heating a composition containing 90 parts of dry $D_4$, 0.03 part of MM and 0.02 part of tetramethylammonium siloxanolate containing the equivalent of 0.002 part of tetramethylammonium hydroxide for 1 hour at 80° C. In one case, 1.0 part of dry dimethylformamide was also present. The polymers are then heated to 190° C. and stripped under high vacuum for 1 hour, the volatile material being collected in a cold trap and analyzed by gas chromatography. The following table illustrates the improved utilization of MM in the presence of dimethylformamide.

|  | With DMF | Without DMF |
| --- | --- | --- |
| MM found in strippings, percent | 10 | 50 |
| MM utilization, percent | 90 | 50 |
| Plasticity (Williams Plastometer) | 92 | 100 |

While specific embodiments of the invention have been shown and described, the invention should not be limited to the specific cyclic siloxanes described therein. It is intended, therefore to include all modifications within the spirit and scope of this invention.

The invention claimed is:

1. A method for preparing siloxane fluids which comprises polymerizing a mixture containing (1) a cyclic siloxane embraced by the formula:

$$(R_2SiO)_x$$

in which R is selected from the group consisting of alkyl groups having up to 8 carbon atoms, phenyl groups and chlorinated phenyl groups and $x$ is a number of from 3 to 8, (2) hexamethyldisiloxane, (3) a preformed tetraalkylammonium siloxanolate catalyst, said catalyst obtained from the reaction of tetraalkylammonium hydroxide and an octaorganocyclotetrasiloxane in which none of the organo groups are in excess of 8 carbon atoms and (4) a promoter for said catalyst which is selected from the class consisting of dimethylsulfoxide, hexamethyl phosphoric triamide and N,N-dialkylcarboxylic amides.

2. The method of claim 1 wherein the cyclic siloxane may be represented by the formula:

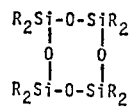

in which R is selected from the group consisting of methyl and phenyl radicals.

3. The method of claim 1 wherein the cyclic siloxane is octamethylcyclotetrasiloxane.

4. The mehod of claim 1 wherein the cyclic siloxane is a mixture of octamethylcyclotetrasiloxane and octaphenylcyclotetrasiloxane.

5. The method of claim 1 wherein the cyclic siloxane is a mixture of octamethylcyclotetrasiloxane and a methylphenylcyclotetrasiloxane.

6. The method of claim 1 wherein the promoter is present in an amount equivalent to from 0.5 to 5 percent of the weight of the siloxane, and the catalyst is present in an amount corresponding to from about 5–200 p.p.m. of the tetraalkylammonium hydroxide equivalent therein.

7. The method of claim 6 wherein the cyclic siloxane is octamethylcyclotetrasiloxane.

8. The method of claim 6 wherein the cyclic siloxane is a mixture of octamethylcyclotetrasiloxane and octaphenylcyclotetrasiloxane.

9. The method of claim 6 wherein the cyclic siloxane is a mixture of octamethylcyclotetrasiloxane and methylphenylcyclotetrasiloxane.

References Cited

UNITED STATES PATENTS 3,433,765   3/1969   Geipel _____ 260—46.5

TOBIAS E. LEVOW, Primary Examiner

P. F. SHAVER, Assistant Examiner

U.S. Cl. X.R.

260—46.5 G, 46.5 R